(12) United States Patent
Baba et al.

(10) Patent No.: US 7,256,783 B2
(45) Date of Patent: Aug. 14, 2007

(54) IMAGE CAPTURE DEVICE, A METHOD OF CAPTURING IMAGES, AN IMAGE PRODUCING DEVICE AND A METHOD OF PRODUCING IMAGES

(75) Inventors: Shigeyuki Baba, Tokyo (JP); Akira Shirakura, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/977,439

(22) Filed: Oct. 15, 2001

(65) Prior Publication Data

US 2002/0071144 A1    Jun. 13, 2002

(30) Foreign Application Priority Data

Oct. 19, 2000   (JP) .......................... P2000-319773

(51) Int. Cl.
   *G06T 15/00*   (2006.01)
(52) U.S. Cl. .................. 345/427; 359/462; 359/464
(58) Field of Classification Search ............... 345/427, 345/419, 428; 359/462, 463, 464
   See application file for complete search history.

(56) References Cited

U.S. PATENT DOCUMENTS

| | | | | |
|---|---|---|---|---|
| 4,677,468 A | * | 6/1987 | Morishita | 348/47 |
| 4,819,064 A | * | 4/1989 | Diner | 348/47 |
| 5,696,596 A | * | 12/1997 | Taniguchi | 358/300 |
| 5,764,266 A | * | 6/1998 | Azuma et al. | 347/171 |
| 6,061,179 A | * | 5/2000 | Inoguchi et al. | 359/464 |
| 6,094,216 A | * | 7/2000 | Taniguchi et al. | 348/51 |
| 6,204,967 B1 | * | 3/2001 | Morishima et al. | 359/462 |
| 6,233,003 B1 | * | 5/2001 | Ono | 348/47 |
| 6,278,480 B1 | * | 8/2001 | Kurahashi et al. | 348/59 |
| 6,353,457 B2 | * | 3/2002 | Uomori et al. | 348/47 |
| 6,549,650 B1 | * | 4/2003 | Ishikawa et al. | 382/154 |
| 6,556,307 B1 | * | 4/2003 | Norita et al. | 356/608 |
| 6,574,047 B2 | * | 6/2003 | Hawver | 359/626 |

* cited by examiner

*Primary Examiner*—Phu K. Nguyen
(74) *Attorney, Agent, or Firm*—Lerner, David, Littenberg, Krumholz & Mentlik, LLP

(57) ABSTRACT

The imaging device reads out a first time spatial parameter required for image capturing of an object from various time spatial parameters stored in the storage server and/or recorded on the recording medium, captures the images of the object and produces the captured image data on the basis of this time spatial parameter. The imaging device causes the captured image data and the time spatial parameter corresponding thereto to be stored in the storage server, and/or to be recorded on the recording medium. These captured image data and the time spatial parameter corresponding thereto are supplied to the image data processing unit in the holographic stereogram producing device, in which this supplied time spatial parameter is used as a second time spatial parameter which is required at the time of producing a holographic stereogram.

2 Claims, 9 Drawing Sheets

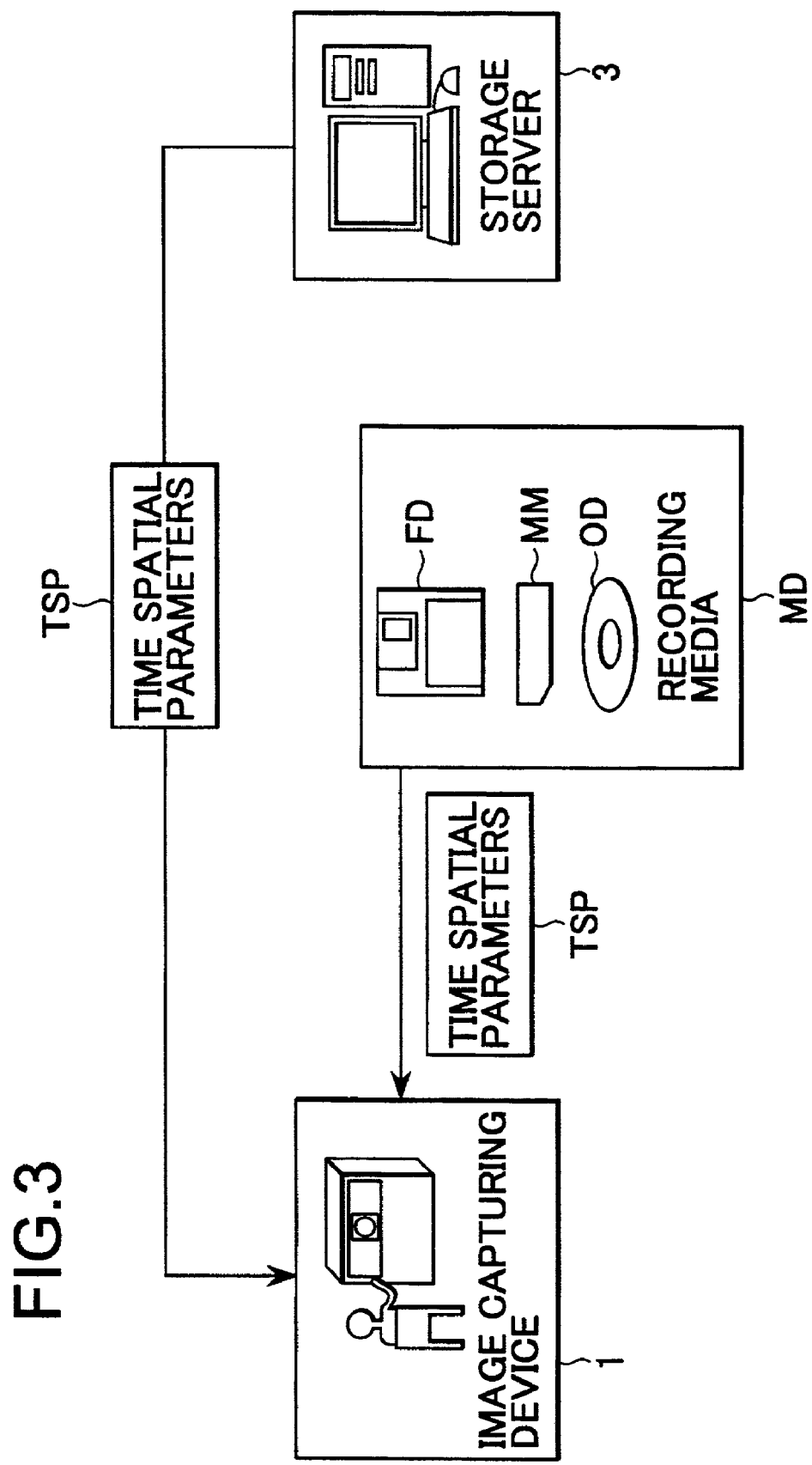

IMAGE CAPTURE DEVICE, A METHOD OF CAPTURING IMAGES, AN IMAGE PRODUCING DEVICE AND A METHOD OF PRODUCING IMAGES

CROSS REFERENCE TO RELATED APPLICATIONS

This application claims priority to Japanese Patent Application No. JP-2000-319773, and the disclosure of that application is incorporated herein by reference to the extent permitted by law.

BACKGROUND OF THE INVENTION

1. Field of the Invention

The present invention relates to an image capture device for capturing images of an object, a method of capturing images thereof, an image producing device for producing images and a method thereof.

2. Description of the Related Art

Generally, recording of graphics information has been directed mostly to recording of planar 2-dimensional graphics information, however, recently, a technology for recording a solid (stereoscopic) image such as a holographic stereogram is being realized.

The holographic stereogram is produced, for example, in such a manner that a plurality of images of an object are captured sequentially from different viewing points as its original images, then they are sequentially exposed to be recorded as element holograms in a strip or dot patterns on a single hologram recording medium. When this holographic stereogram is viewed by an observer with his/her one eye from a given position, a set of multiple pieces of graphic information recorded as part of each element hologram are recognized as a 2-dimensional image, while on the other hand, when viewed by the observer with one eye from another position different from the above-mentioned given position, a set of multiple pieces of graphic information recorded as another part of the each element hologram are recognized as another 2-dimensional image. Therefore, when the observer views the holographic stereogram with his/her both eyes, its exposed and recorded image is recognized as a 3-dimensional image because of a parallax between the both eyes.

As related applications utilizing such holographic stereogram, there are printer systems that combine an image capturing device for capturing images of an object and forming a string of parallax image thereof with a printing device for generating a holographic stereogram and outputting as a printed matter, for example, as disclosed in "Instant holographic portrait printing system" by Akira Shirakura, Nobuhiro Kihara and Shigeyuki Baba, Proceedings of SPIE, Vol. 3293, pp.246-253, January 1998, "High-speed hologram portrait print system" by Kihara, Shirakura, Baba, 3-D Image Conference 1998, July, 1998, and the like. These printing systems can provide a set of services from an image capturing of an object to printing of its holographic images at the same service spot.

SUMMARY OF THE INVENTION

When a parallax image string is obtained by shooting its images as done in the printer systems described above, it should be noted that there exist various parameters to be considered such as an image shooting angle, a shooting distance indicating a positional relation between an object and a viewing (shooting) point, a length of translation motion of an image capturing device, and a pitch of shooting. Further, when producing a holographic stereogram and outputting it as a printed matter, there are various parameters also to be considered in its printing device such as at what viewing angle and at what exposure pitch its holographic stereogram should be exposed and recorded, and so on.

Here, also it should be noted that in a case of producing a printed matter such as the holographic stereogram using the parallax image string which is obtained with the image-capturing device, it becomes necessary to ensure for various parameters in the image capturing device and those in the printing device to be matched and coordinated therebetween. If there is any mismatching therebetween, a proper and correct solid (stereoscopic) image cannot be obtained.

The parallax image string can also be produced as computer graphics images created such as CG (Computer Graphics). Even in such a case where a printed matter, for example, of a holographic stereogram is produced using the parallax image string created by CG or the like, it is essential in order to be able to obtain a proper and correct stereoscopic image that various parameters at the time of image shooting and at the time of printing in its printer are matched and coordinated therebetween.

For example, in a white light reproduced holographic stereogram, there occurs such a phenomenon that a distortion and/or blurring in a holographic stereogram image substantially increases as its viewing point of observation moves away from its hologram surface which is a reference plane of its image recording. This phenomenon occurs due to a fact that an image shooting distance at the time of shooting a parallax image string to obtain original images, and/or at the time of creating by computer graphics, is maintained as shot in each element hologram that was exposed and recorded on a hologram recording medium, thereby introducing a deviation in its viewing point distance.

In order to prevent such phenomena from occurring, in the holographic stereogram producing device for producing a holographic stereogram, a viewing point conversion processing is performed for correcting a spatial distortion in a reproduced hologram image, for example, by interchanging respective element parallax images in the parallax image string. This viewing point conversion processing is a processing whereby respective element parallax images are interchanged to be reconstructed as modified element parallax images for forming an image in a slit pattern in a parallax direction so that a reproduced image from a recorded image, which was exposed according to the reconstructed element parallax images and recorded on a hologram recording medium, is substantially constantly positioned in proximity to the hologram surface as described above.

The viewing points of the element parallax images having undergone the above-mentioned viewing point conversion processing do not always coincide with the viewing points of the element parallax images that are obtained through the image shooting and/or created by computer graphics, and in such a case, these ones that have the nearest viewing point thereto are selected. Therefore, the element parallax images that have been reconstructed may become discontinuous thereby impairing quality of its recorded image. By the way, such a discontinuous phenomenon is referred to as a "jaggy" phenomenon.

Hence, in a case where a printed matter of a holographic stereogram or the like is generated using a parallax image string which was obtained by image capturing and/or computer graphics, it has been necessary to ensure for various parameters required at the time of shooting the images and/or creating by the computer graphics to be coordinated with various parameter required at the time of printing thereof.

However, because setting of these parameters required at the time of image shooting and/or creating by computer graphics and at the time of printing thereof is performed independently therebetween, there has been such a problem that their setting was complicated and time consuming, and that without knowledge of these parameters, a correct and optimum stereoscopic image cannot be obtained.

Therefore, it has been desired to provide for a holographic stereogram image capturing (shooting) device, a method thereof, an image producing device and a method thereof, in which the above-mentioned various parameters can be automatically set up, a sequence (string) of parallax images can be formulated easily, in a short period of time, and further which can contribute to provision of a holographic stereogram that is free from distortion and blurring.

An imaging device according to one aspect of the invention is an image capture device for capturing images of an object and for forming a sequence (string) of parallax images comprising a plurality of image data containing parallax information. The image capture device is provided with a controller for enabling to capture the images of the object by moving its viewing point (shooting point) along a translation track on the basis of a time spatial parameter indicating time and/or spatial information read out from an external device. This time spatial parameter is required at the time of its image capturing.

The image capturing device embodying the present invention described above, under control of the controller, reads in a desirable time spatial parameter from the outside, captures the images of the object on the basis of this time spatial parameter, and accordingly forms a parallax image string.

A method of image capturing according to one aspect of the present invention, for enabling to capture the images of an object with an image capturing device and to generate a parallax image string including a plurality of image data containing parallax information, is comprised of the steps of: shooting images of the object by moving a viewing point of the image capturing device along a translation motion track on the basis of a time spatial parameter indicative of time and/or spatial information read in from the outside, which information being necessary for shooting the images, and accordingly forming the parallax image string.

An image forming device according to another aspect of the present invention, which is a graphic image generating device for generating a sequence (string) of parallax images comprising a plurality of computer graphics data containing parallax information, is provided with a controller for enabling virtually to shoot images of an object by moving a viewing point of a virtual imaging device and generate a parallax image string, on the basis of a time spatial parameter indicative of time and/or spatial parameter information which is necessary at the time of generating its images, which parameter being read in from the outside.

A method of forming images according to another aspect of the present invention, forming a sequence (string) of parallax images comprising a plurality of computer graphics data containing parallax information, is comprised of the steps of shooting images of an object by moving a viewing point of a virtual imaging device, and forming a parallax image string on the basis of time spatial parameters indicative of time and/or spatial information necessary at the time of forming its images, which parameters being read in from the outside.

An image forming device according to still another aspect of the invention, which is an image forming device for forming another string of parallax images by performing a synthesizing processing for a string of parallax images comprising a plurality of image data containing parallax information, is provided with a controller for enabling to process, as an object of synthesis, a plurality of different parallax image strings having a corresponding (matching) time spatial parameter indicative of time and/or spatial information in their parallax image strings, and outputting another string of different parallax images generated by the synthesizing processing, together with this time spatial parameter.

A method of forming images according to still another aspect of the invention, which is a method of forming another string of parallax images by performing a synthesizing processing for a string of parallax images comprising a plurality of image data containing parallax information, is comprised of the steps of processing, as an object of its synthesis, a plurality of different parallax image strings each having corresponding (matching) time spatial parameters indicative of time and/or spatial information in their parallax image strings, and outputting the another string of different parallax images generated by the synthesizing processing together with their time spatial parameters associated therewith.

BRIEF DESCRIPTION OF THE DRAWINGS

The above and other objects, features and advantages of the present invention will become more apparent from the following description of the presently preferred exemplary embodiment of the invention taken in conjunction with the accompanying drawings, in which:

FIGS. 2A and 2B are diagrams indicating an optical system in the holographic stereogram producing device, in which FIG. 2A is a front view of the optical system in the holographic stereogram producing device, while FIG. 2B is a plan view thereof;

FIG. 3 shows an example describing a manner how time spatial parameters are supplied to an image capture device for producing image data of an object as original image data for use in the holographic stereogram producing device;

DESCRIPTION OF THE PREFERRED EMBODIMENTS

A preferred embodiment of the present invention will be described in detail by referring to the accompanying drawings in the following.

Figure 1:
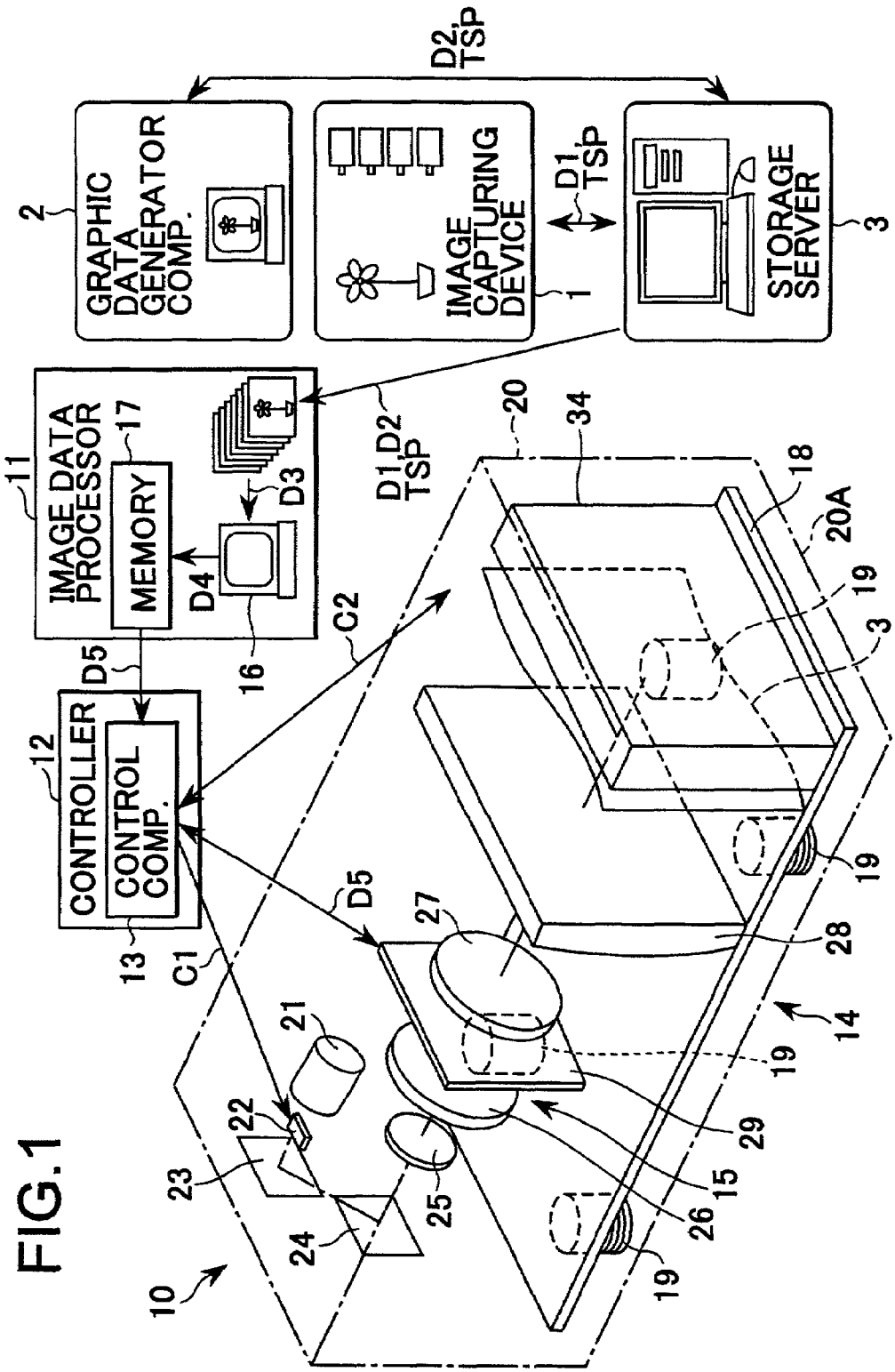
FIG. 1 is a schematic block diagram indicating an overall arrangement of a holographic stereogram producing device according to an embodiment of the present invention.

This preferred embodiment of the present invention pertains to a holographic stereogram producing device 10 that produces a holographic stereogram by exposing and recording a plurality of holographic stereogram images on a holographic recording medium on the basis of a string of a plurality of parallax images as shown in FIG. 1. In this holographic stereogram producing device 10, for producing a holographic stereogram on the basis of a parallax image string obtained from captured images of an object by an image capture device 1 and/or created by a computer 2 for generating graphic data, various parameters indicative of time and/or spatial information which becomes necessary at the time of image capturing and/or at the time of creating image data are controlled in batch in a storage server 3 and/or in a recording medium (not shown) as the time spatial parameter and is used in forming the parallax image string.

The holographic stereogram producing device 10 is comprised of: an image data processing unit 11 for processing image data to be exposed and recorded; a controller 12 having a control computer 13 for controlling the holographic stereogram producing device 10 on the whole; and a holographic stereogram producing unit 14 including an optical system 15 for use in forming the holographic stereogram.

The image data processing unit 11, which has an image processing computer 16 and a memory device 17, forms a parallax image string D3 on the basis of captured image data D1 containing parallax information and/or computer graphics data D2 or the like.

By way of example, captured image data D1 are, for example, motion image data or a plurality of 2-dimensional still images which are supplied from the image capture device 1, which captures images simultaneously using a multiple-lens camera or continuously using a moving camera, for example, to the storage server 3 through which further to be supplied, and/or motion image data or a plurality of 2-dimensional still images which are supplied from the image capture device 1 as recorded in a recording medium (not shown) to be described later, wherein parallax information is contained between respective image data which constitute the captured image data D1. Further, computer graphics data D2 are, for example, motion image data or a plurality of 2-dimensional still images, which are generated by the graphic data generating computer 2 as CAD (Computer Aided Design) or CG (Computer Graphics) data, and supplied to the storage server 3, through which further to be supplied, and/or motion image data or a plurality of 2-dimensional still image data supplied from the graphics data generating computer 2 as recorded in a recording medium (not shown) to be described later, wherein parallax information is contained between respective image data that constitute the computer graphics data D2.

The image processing unit 11 processes a parallax image data string D3 which is based on the captured image data D1 and/or the computer graphics data D2 with a predetermined image processing for the holographic stereogram by means of the image processing computer 16 so as to generate a hologram image data D4. At this time, the image processing unit 11 performs an image processing such as a viewing point conversion processing or a synthesizing processing (not shown) to be described later on the parallax image data string D3, on the basis of a time spatial parameter TSP supplied from the storage server 3 and/or a time spatial parameter TSP recorded in a recording medium (not shown) to be described later, so as to generate a hologram image data D4. This hologram image data D4 is temporarily stored in a storage device 17 such as a memory, a hard disc device or the like. The image data processing unit 11, as will be described later, reads out an element hologram image data D5 per one frame of image from the hologram image data D4 stored in memory device 17 for use at the time of exposing and recording element hologram images on a hologram recording medium 4, and supplies this element hologram image data D5 to the control computer 13 in the controller 12.

The control computer 13 controls the holographic stereogram producing unit 14 such that a respective element display image based on the element hologram image data D5 supplied from the image data processing unit 11 is exposed and recorded sequentially as hologram elements in a strip-like pattern on the hologram recording medium 4 mounted on one part of the holographic stereogram producing unit 14. During this operation, the control computer 13, as will be described later, controls operations of respective components and mechanisms in the holographic stereogram producing unit 14.

In the holographic stereogram producing unit 14, respective members that constitute the optical system 15 are disposed as supported on a support plate (optical table) 18, and this support plate 18 is mounted on a housing 20 via dampers 19.

Figures 2A, 2B:
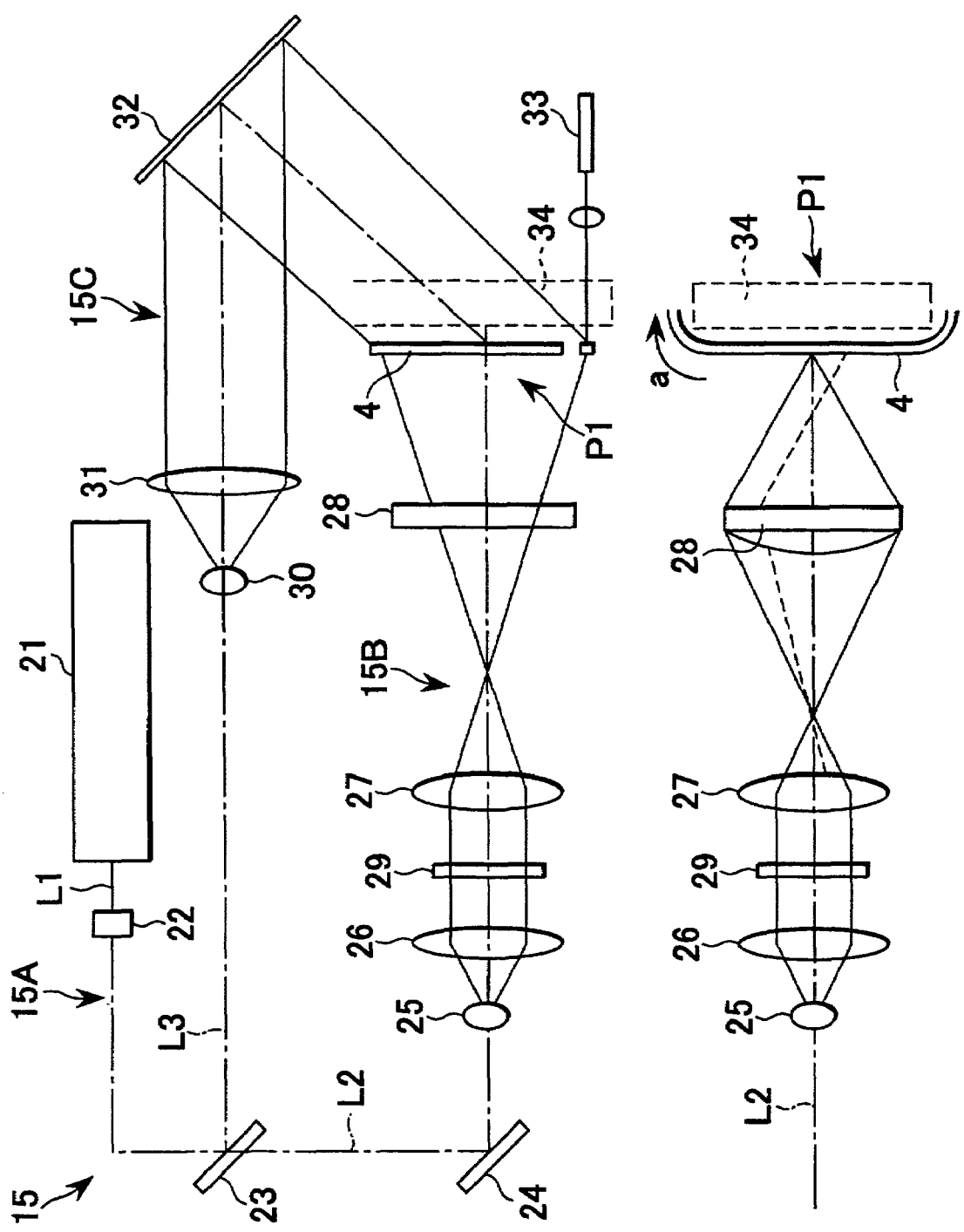

The optical system 15, as shown in FIGS. 1 and 2, includes an incident light optical system 15A, an object light optical system 15B and a reference light optical system 15C. Of these optical systems, in order to enhance interference between its object light L2 and its reference light L3, the object light optical system 15B and the reference light optical system 15C are constructed such that respective light paths of the object light L2 and the reference light L3 to an exposure/recording portion P1 become substantially identical. By the way, because the holographic stereogram producing device 10 uses the hologram recording medium 4 which is a photosensitive material, the housing 20 has a light-tight structure at least for its optical system 15.

The incident light optical system 15A has a laser source 21 for emitting a laser beam L1, a shutter mechanism 22 for allowing the laser beam L1 to transmit or interrupt, and a half mirror 23 for splitting the laser beam L1 into an object light L2 and a reference light L3.

The laser source 21 is constructed using a laser device capable of emitting, for example, a single wave and high interference laser beam L1 such as a semiconductor excited YAG laser device, an air cooled argon ion laser device, an air cooled krypton laser device or the like.

The shutter mechanism 22 is opened and closed in response to a control signal C1 output from the control computer 13 corresponding to an output timing of the element hologram image data D5 so as to allow for the laser beam L1 to fall on the hologram recording medium 4 positioned at the exposure/recording portion P1 via the optical system in the subsequent stage, or to interrupt the laser beam L1 on the way to the hologram recording medium 4.

The half mirror 23 splits the laser beam L1 incident thereon into a transmission light and a reflection light. The laser beam L1 is thus used as the transmission light that is the object light L2 and as the reflection light that is the reference light L3. These object light L2 and reference light L3 are directed to enter the object light optical system 15B or the reference light optical system 15C provided in the subsequent stages, respectively.

Further, the incident light optical system 15A may be provided with a full-reflection mirror and the like in order to change the direction of the laser beam L1 to make the lengths of optical paths of the object light L2 and the reference light L3 become identical. Still further, the shutter mechanism 22 may be constructed with, for example, a mechanically driven shutter member or an electronic shutter using an AOM (acousto-optic modulation). Namely, the shutter mechanism 22 may be of any type if operable to open and close so as to transmit and interrupt the laser beam L1.

The object light optical system 15B is constructed by disposing its optical components such as a full-reflection mirror 24, a first cylindrical lens 25, a collimator lens 26, a projection lens 27 and a second cylindrical lens 28 sequentially along an optical axis thereof.

The full-reflection mirror 24 reflects fully the object light L2 transmitted through the half-mirror 23. The object light L2 having been reflected on the full-reflection mirror 24 is supplied to the first cylindrical lens 25.

The first cylindrical lens 25 which is constructed in combination of a convex lens and a pin hole diffuses the object light L2 having been fully reflected on the full-reflection mirror 24 in one dimensional direction corresponding to a width of a display screen of a transmission type liquid crystal display 29 which will be described later.

The collimator lens 26 collimates the object light L2 having been diffused by the first cylindrical lens 25 and directs a collimated beam to the transmission type liquid crystal display 29.

The projection lens 27 projects the object light L2 toward the second cylindrical lens 28.

The second cylindrical lens 28 converges the collimated object light L2 in transverse directions on the exposure/recording portion P1.

Further, in the object light optical system 15B, between the collimator lens 26 and the projection lens 27, there is provided the transmission type liquid crystal display 29. On this transmission type liquid crystal display 29 are displayed element hologram images sequentially based on the element hologram image data D5 supplied from the control computer 13. In addition, the control computer 13 supplies a drive signal C2 to a recording medium feeder device 34 (to be described later) of the hologram recording medium 4, corresponding to the output timing of the element hologram image data D5, so as to control its operation to feed in the hologram recording medium 4.

In this object light optical system 15B, the object light L2 in a state of a spot beam of incidence split from the incident light optical system 15A is diffused by means of the first cylindrical lens 25, then, collimated by passing through the collimator lens 26. Further, in the object light optical system 15B, the object light L2 incident on the transmission type liquid crystal display 29 via the collimator lens 26 receives image-modulation according to element hologram images displayed on this transmission type liquid crystal display 29 and is directed via the projection lens 27 to the second cylindrical lens 28. Then, in the object light optical system 15B, while the shutter mechanism 22 is open, the object light L2 subjected to the image modulation is allowed to fall on the hologram recording medium 4 at the exposure/record portion P1 so as to be exposed and recorded corresponding to the element hologram image having been displayed.

The reference light optical system 15C is constructed with a cylindrical lens 30, a collimator lens 31 and a full-reflection mirror 32, which are disposed sequentially from its input side along an optical axis thereof.

The cylindrical lens 30, which is constructed using a convex lens in combination with a pin hole likewise the first cylindrical lens 25 in the object light optical system 15B described above, diffuses the reference light L3 having been split by reflection on the half mirror 23 in one-dimensional direction and into a predetermined width, more specifically, to have a width corresponding to a width of the display screen of the transmission type liquid crystal display 29.

The collimator lens 31 collimates the reference light L3 having been diffused by the cylindrical lens 30 into a collimated beam of light.

The full-reflection mirror 32 reflects the reference light L3 and directs it to fall on a rear surface of the hologram recording medium 4 of the exposure/record portion P1.

By way of example, although it is described that the shutter mechanism 22 is disposed in the incident light optical system 15A, it is not limited thereto. The shutter mechanism 22 may be disposed in both optical systems of the object light optical system 15B and the reference light optical system 15C respectively in front and backward of the hologram recording medium 4 of the exposure/record member P1. Further, it may be arranged for the shutter mechanism 22 to be able to control the object light L2 and the reference light L3 directed to the hologram recording medium 4 to impinge or to be interrupted in synchronism immediately before they fall on the hologram recording medium 4.

In this optical system 15, as described above, the object light optical system 15B transmitting the object light L2 split by means of the half mirror 23 and the reference optical system 15C transmitting the reference light L3 are constructed to have substantially an identical length of light path. Therefore, this optical system 15 ensures for the optical interference between the object light L2 and the reference light L3 to be improved, thereby enabling to produce a holographic stereogram in which a clearer reproduced image can be obtained.

Still further, this optical system 15 is provided with an interference fringe detector 33 when required, which, if it is anticipated that a satisfactory holographic stereogram cannot be produced due to vibration or the like, stops the exposure and recording on the hologram recording medium 4.

The interference fringe detector 33 detects a state of interference fringes generated by interaction between the object light L2 and the reference light L3 impinging on the hologram recording medium 4 after passing through respective optical systems described above. The interference fringe detector 33, which is constructed, for example, with a CCD (charge coupled device) camera, detects a state of fluctuation in the interference fringes formed in a detection area separate from the exposure/recording area of the hologram recording medium 4, at a precision of the wavelength order of the laser beam L1 emitted from the laser source 21.

If a state of fluctuation in the interference fringes in excess of a predetermined value is detected in its detection area, the interference fringe detector 33 sends a detection signal to the control computer 13. In response to this detection signal, the control computer 13 immobilizes the shutter mechanism 22. Thereby, because of the interruption of the object light L2 and the reference light L3 to the hologram recording medium 4, generation of the holographic stereogram thereon is stopped. Further, if the state of fluctuation in the interference fringes detected in its detection area is within the predetermined value, the interference fringe detector 33 stops to send its detection signal to the control computer 13. Thereby, the control computer 13 mobilizes the shutter mechanism 22 to allow for the object light L2 and the reference light L3 to fall on the hologram recording medium 4 so as to form the holographic stereogram thereon.

As described hereinabove, by provision of the interference fringe detector 33, the holographic stereogram producing device 10 ensures for the interference fringes due to the interaction between the object light L2 and the reference light L3 to be stabilized and allow for a stable holographic stereogram to be exposed and recorded on the hologram recording medium 4, thus providing a bright and clear holographic stereogram with an improved refraction efficiency. Still further, by the provision of the interference fringe detector 33, the holographic stereogram producing device 10 may be installed in any place without being limited in its site of location, and substantially improving ease of use.

The above-mentioned interference fringe detector 33 has been described by way of example that it is disposed in proximity to the hologram recording medium 4, and arranged to detect part of the interference fringes formed in its detection area, however, it is not limited thereto. The interference fringe detector 33 may be constructed also such that parts of the object light L2 and the reference light L3 are guided to other positions using, for example, a mirror or the like to form interference fringes which are to be detected. Further, the interference fringe detection device 33 may be arranged also in such a manner that interference fringes are formed from another object light L2 and another reference light L3 which are split using such as a half-mirror or the like, and used for the purpose of detection of the fluctuation in the interference fringes. Still further, the interference fringe detection device 33 may be arranged such that a part of the laser beam L1 emitted from the laser source 21 is directly taken out to form interference fringes for use of detection of vibration. Still more, the interference fringe detection device 33 may also be constructed such that an optical system dedicated for use of detection of vibration is provided separate from the optical system 15, and vibration is detected through detection of fluctuation in the interference fringes.

The holographic stereogram producing device 10 is further provided with the recording medium feeder device 34 for feeding the hologram recording medium 4 in a direction of arrow "a" in FIG. 2, intermittently per one element hologram portion.

The recording medium feeder device 34 drives to feed in the hologram recording medium 4 intermittently in response to the drive signal C2 sent from the control computer 13. Further, the holographic stereogram producing device 10 operates the shutter mechanism 22 to release open the optical path of the laser beam L1 in synchronism with the operation of the recording medium feeder device 34 and in response to a control signal C1 sent from the control computer 13.

The holographic stereogram producing device 10 described hereinabove is constructed by mounting the components and parts of the above-mentioned optical system 15 on the support plate 18 made of an aluminum plate, aluminum alloy plate or the like as shown in FIG. 1. If a vibration or the like is applied from outside to this holographic stereogram producing device 10, there arises the problem as described above that because the object light L2 and the reference light L3 cannot be supplied stably to the hologram recording medium 4, stable and high-precision interference fringes cannot be exposed and recorded on this hologram recording medium 4. Therefore, in order to suppress such adverse effects on the optical system 15 and so on due to vibration or the like, the support plate 18 of the holographic stereogram producing device 10 is supported by means of a plurality of dampers 19.

Respective dampers 19, detailed description thereof will be omitted, are comprised of a high elastic member such as an air spring, rubber or coil spring, with one end thereof connected to the support plate 18 and the other end thereof fixed on an upper surface of a base member 20A of the housing 20. These dampers 19 act to suppress the vibration or oscillation applied from outside to the optical system 15, preferably less than a wavelength of the laser beam L1 which is approximately 1 µm, or more preferably less than ⅕ thereof. Therefore, according to the holographic stereogram producing device 10 of the present invention, even if vibration or the like is applied from the outside, because that the optical system 15 is maintained in a stable condition, the object light L2 and the reference light L3 are ensured to fall on the hologram recording medium 4 as a stable and high-precision light of incidence free from fluctuations. Thereby, the holographic stereogram producing device 10 can provide a clear and bright holographic stereogram with substantially improved refraction efficiency.

According to this holographic stereogram producing device 10 described above, by provision of the drive signal C2 from the control computer 13 in the controller unit 12 to the recording medium feeder device 34, which signal is sent upon completion of every exposure/recording of one element image portion and corresponding to a subsequent element hologram, the hologram recording medium 4 is driven along its traveling path by a length corresponding to the one element hologram so as to feed in an unexposed portion of the recording medium, and which is stopped at its position corresponding to the exposure/recording portion P1. By the way, the holographic stereogram producing device 10 is constructed such as to ensure for the oscillation generated in the hologram recording medium 4 by the drive motion to be subside as rapidly as possible. The hologram recording medium 4 is made of a long photosensitive film, and is wound around a feed roller which is provided rotatably, for example, within a light-tight film cartridge (not shown). When this film cartridge is loaded in the holographic stereogram producing device 10, the hologram recording medium 4 is pulled out and unfolded in the holographic stereogram producing device 10 to be driven along its path by the recording medium feeder device 34.

In this condition of the holographic stereogram producing device 10, the shutter mechanism 22 is released open to transmit the object light L2 to receive the image modulation and the reference light L3 to fall on the hologram recording medium 4 from the front and rear surfaces at the exposure/recording portion P1, thereby enabling to expose and record the interference fringes corresponding to the element hologram image on the recording medium. Upon completion of the exposure and recording corresponding to one element image in the holographic stereogram producing device 10, the drive signal C2 is sent from the control computer 13 of the controller 12 to the recording medium feeder device 34 so as to feed in intermittently the hologram recording medium 4 by the predetermined length as quickly as possible. By the way, the hologram recording medium 4 is wound around a collecting roll (not shown) at its leading edge.

The holographic stereogram producing device 10 repeats the above-mentioned procedures sequentially so as to expose and record a plurality of holographic stereogram images in succession on the long film of the hologram recording medium 4, then performs a predetermined fixing processing to accomplish the production of the holographic stereogram.

Now, referring again to the image capture device 1 that produces the captured image data D1 as the original image data for use in the above-mentioned holographic stereogram producing device 10, at the time of capturing images of the object to form the captured image data D1, the time spatial parameter information TSP that is necessary when capturing images for forming the image data D1 is supplied to the image capture device 1 from the outside. Therefore, on the basis of this time spatial parameter TSP supplied from the outside, the image capture device 1 performs its image capturing.

More specifically, as shown in FIG. 3, the image capture device 1 reads out an appropriate time spatial parameter TSP necessary for its image capturing from various time spatial parameters stored in the storage server 3 via the network under control of a controller (not shown), and executes its image capturing on the basis of this time spatial parameter TSP read out. Here, the time spatial parameter TSP refers to pieces of information indicative of image capture conditions such as an image capture time in the image capture device 1, an image capture angle thereof, an image capture distance indicating a positional relation between an imaging point of the image capture device 1 and an object, a translation motion distance of the image capture device 1 and/or a pitch of imaging, and so on. The image capture device 1 performs image shooting of the object by moving its viewing (shooting) point on the basis of this time spatial parameter TSP and under control of a controller (not shown) so as to form the captured image data D1. Further, as shown in FIG. 3, the image capture device 1 may be arranged also that at first it receives recording media MD supplied, for example, as a magnetic disc FD, various memories MM such as a flash memory, an optical disc OD or the like, which record various time spatial parameters, and reads out appropriate time spatial parameters required for its image capturing therefrom under control of a controller (not shown) and performs its shooting on the basis of this time spatial parameter TSP.

Figure 4:
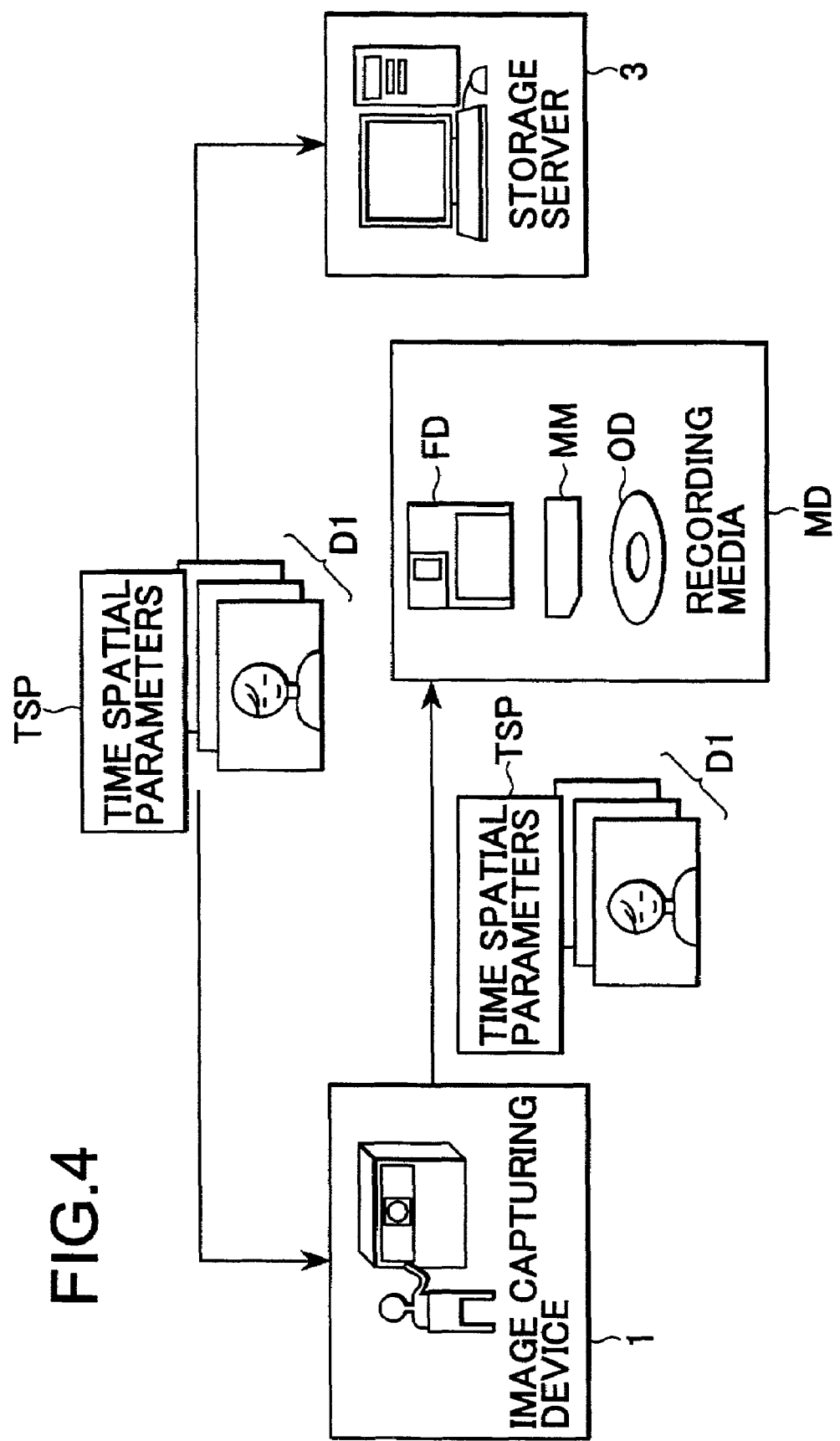
FIG. 4 shows an example describing a manner how the image data of the captured image and the time spatial parameter associated therewith are output from the image capture device.

Then, as shown in FIG. 4, the image capture device 1 supplies the captured image data D1 and the time spatial parameter TSP corresponding thereto to the storage server 3 to be stored therein via the network under control of a controller (not shown). Further, as shown in the drawing, the image capture device 1 causes the captured image data D1 and the time spatial parameter TSP corresponding thereto to be recorded in the above-mentioned recording media MD. The captured image data D1 and the time spatial parameter TSP corresponding thereto that are stored in the storage server 3, and/or the captured image data D1 and the time spatial parameter TSP corresponding thereto that are recorded in the recording media MD are supplied to the image data processing unit 11 in the holographic stereogram producing device 10 as described above. The time spatial parameters TSP supplied to the image data processing unit 11 are used as the time spatial parameters which are required at the time of producing the holographic stereogram as a printed matter because they specify a degree of a viewing angle at which the image should be exposed and recorded, a pitch of exposure thereof, and so on.

On the other hand, the graphic data generating computer 2 which generates the computer graphics data D2 as an original image data for use in the holographic stereogram producing device 10 is supplied, likewise in the case of producing the captured image data D1 by the image capture device 1, externally with information necessary for generating its graphic data, i.e., time spatial parameter TSP corresponding thereto for use in a virtual image capture device thereof, and on the basis of this time spatial parameter TSP supplied from outside, the computer graphics data D2 is generated.

More specifically, the graphic data generating computer 2, likewise in the case of the image capture device 1 shown in FIG. 3, reads out a necessary time spatial parameter TSP required at the time of generating its computer graphics data from various time spatial parameters stored in the storage server 3 via the network under control of a controller (not shown), and on the basis of this time spatial parameter TSP, generates the computer graphics data D2. As the time spatial parameter TSP referred to in this case of using a virtual image capture device, there are included many pieces of information indicating various virtual image shooting (capturing) conditions such as an image capture time in the virtual imaging (image shooting) device, an angle of image shooting in the virtual imaging device, a shooting distance indicating a positional relation between its image shooting point of the virtual imaging device and the object, a transverse distance and/or shooting pitch of the virtual imaging device, and so on. The graphics data generating computer 2 generates the computer graphics data D2 under the conditions indicated in this time spatial parameter TSP, under control of a controller which is not shown. Further, the graphics data generating computer 2 can also generate the computer graphics data D2 on the basis of an appropriate time spatial parameter TSP which is read from various time spatial parameters recorded in the above-mentioned recording media MD which are delivered thereto and when loaded, under control of a controller which is not shown.

Then, the graphics data generating computer 2, likewise in the case of the image capture device 1 shown in FIG. 4, supplies the computer graphics data D2 generated therein and the time spatial parameter TSP corresponding to this computer graphics data D2 to the storage server 3 to be stored therein via the network, under control of a controller which is not shown. Further, the graphics data generating computer 2 records the computer graphics data D2 generated therein and the time spatial parameter TSP corresponding thereto in the above-mentioned recording media MD, under control of the controller which is not shown. The computer graphics data D2 and the time spatial parameter TSP corresponding thereto that are stored in the storage server 3, and/or the computer graphics data D2 and the time spatial parameter TSP corresponding thereto that are recorded on the recording media MD are supplied to the image data processing unit 11 in the holographic stereogram producing device 10 as described above.

As an example of such processing in the image data processing unit 11 using the time spatial parameters TSP, the viewpoint conversion processing thereof will be described in detail.

In the holographic stereogram producing device 10, as described above, the captured image data D1 and/or the computer generated graphics data D2 are supplied to the image data processing unit 11, and a parallax image data string D3 is generated therein.

Figure 5:
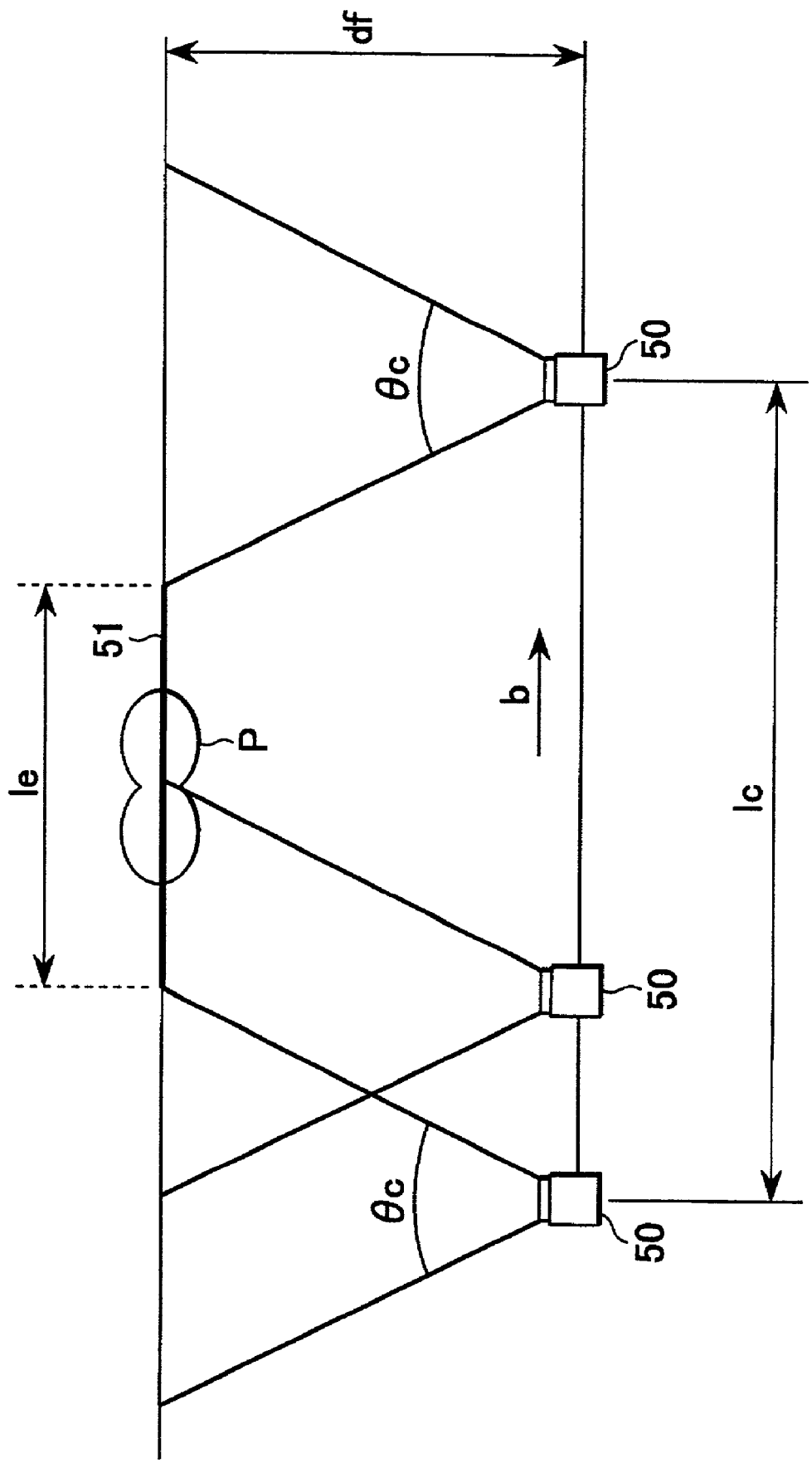
FIG. 5 is a diagram indicating a process of forming a string of parallax image data by an image data processing unit provided in the holographic stereogram producing device, in which images of an object are captured while moving the image capture device along a straight track in translation motion.

The parallax image data string D3 is generated, by the so-called straight track (translation motion) image capturing method. That is, for example, as shown in FIG. 5, an object P is positioned in a fixed state, and a camera 50 is moved along a straight track in parallel relative to the object P while shooting images thereof at a camera viewing angle of θc. By the way, this camera 50 is supposed to be the image capture device 1 or the virtual image capture device in the graphics data generating computer 2. In this case, the camera 50 is moved in a direction of arrow "b" as far as a distance sufficient for a range of its finder to traverse a width "le" of a holographic stereogram 51 from one end to the other end of the width "le", namely, the camera 50 moves in a range of "lc", which equals a parallax image capture width, in an intermittent translation motion along arrow "b" at an equidistance Δlc while shooting images of the object P as many as 500 to 1000 shots. These captured images constitute the parallax image data string D3 having a horizontal parallax with respect to the object P.

Figure 6:
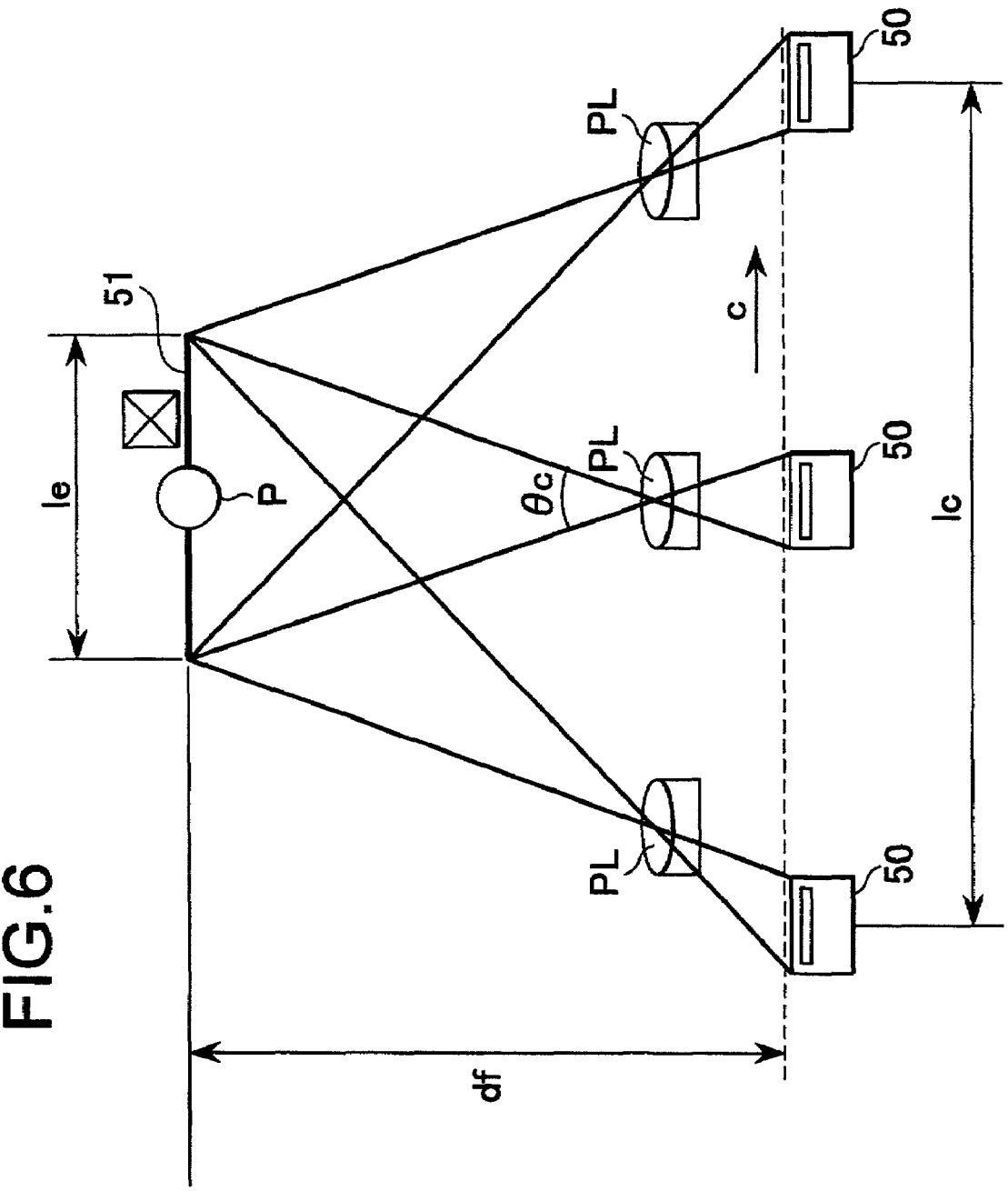
FIG. 6 is a diagram indicating a process of forming a string of parallax image data by the image data processing unit therein, in which images of the object are captured by a re-centering method.

Further, as another method of forming the parallax image data string D3, there is also known the so-called re-centering method. That is, for sequentially capturing images as shown in FIG. 6, while the camera 50 is moved in a direction of arrow "c" in parallel relative to the object P, an object lens PL of the camera undergoes a flap-operation at every position of image shooting so as to enable re-centering of a focused image of the object P in the center portion of the finder prior to shooting its image. In this re-centering method, it is not necessary for its camera image capture angle θc to coincide with the exposure angle of the element hologram image via the second cylindrical lens 28 in the optical system 15 of the holographic stereogram producing device 10 as described above. Thereby, even with a relatively small camera capture angle, image shooting of the object P can be executed efficiently. Further, this re-centering method has additional advantages that an image distortion resulting from the use of a wide-angle lens is avoided, and that an effective resolution of the captured image in the parallax direction can be improved.

By the way, in the holographic stereogram 51 to be reproduced with the white-light, there occurs such a phenomenon that a reproduced image of the holographic stereogram becomes gradually distorted as the viewing point moves away farther from the hologram surface 51a. Still further, with regard to the holographic stereogram 51 to be reproduced with the white-light, it is noted that the closer the reproduced image is constantly located to the hologram surface 51a, the less the image is indistinct. These phenomena occur due to the fact that the positional relationship between the image captured point of the camera 50 and the object P of the parallax image data string D3, namely, an image shooting (capturing) distance "df", is maintained also with regard to the reproduced image of the holographic stereogram 51 which was produced by the holographic stereogram producing device 10, thereby resulting in the deviation due to a difference between the viewing point and the image capturing point.

Figure 7A:
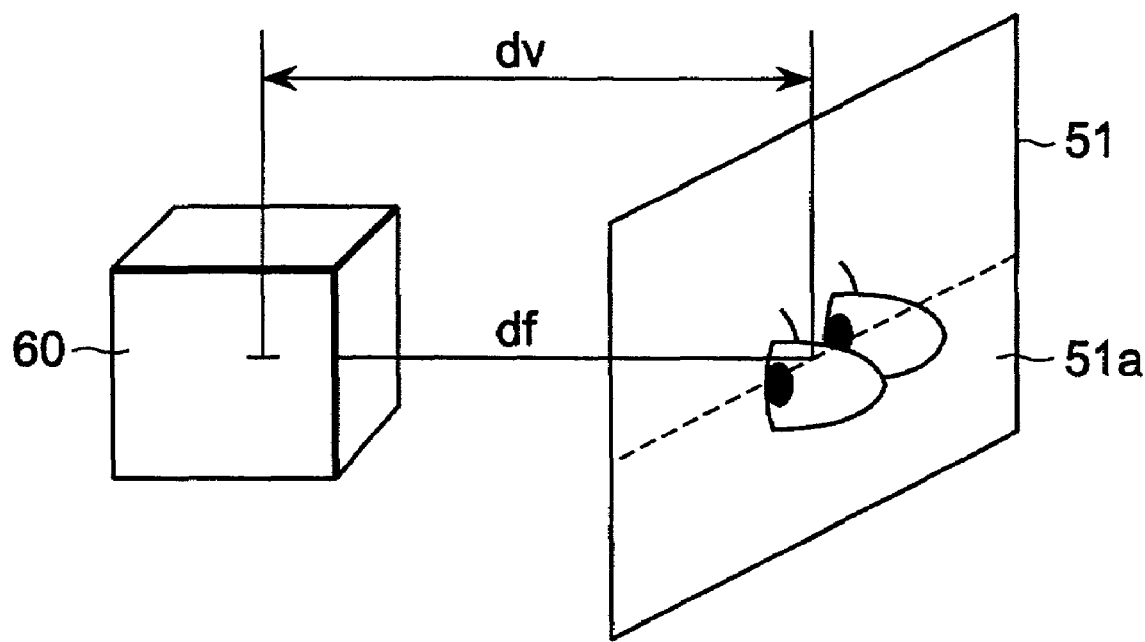
FIGS. 7A and 7B are diagrams indicating a viewing point conversion processing executed by the image data processing unit, in which FIG. 7A indicates a state of a reproduced image of a holographic stereogram that is formed without executing the viewing point conversion processing, while FIG. 7B indicates a state of a reproduced image of a holographic stereogram that is formed by executing the viewing point conversion processing.

Namely, in the holographic stereogram 51, if the parallax image data string D3 without being executed with the viewing point conversion processing (to be described later) is supplied as an element hologram image data D5 to the optical system 15 in the holographic stereogram producing device 10, and if an element hologram image on the basis of this element hologram image data D5 is exposed, recorded and produced on the hologram recording medium 4, its reproduced image 60 appears to be focused in a deviated position deeper than the hologram surface 51a by the length "df" corresponding to the capturing (shooting) distance as shown in FIG. 7A. Therefore, in order to be able to obtain a satisfactorily reproduced image 60 free from distortion and blurring in the holographic stereogram 51, the viewer must contact his/her eyes on the hologram surface 51a as shown in FIG. 7A, and view the reproduced image with its viewing point "dv" coincided with the image shooting distance "df" of the parallax image data string D3, which, however, is not practical.

Therefore, the holographic stereogram producing device 10, when executing the image processing of the parallax image data string D3 by means of the image processing computer 16 in the image data processing unit 11, causes its viewing point conversion processing of the parallax image data string D3 to be carried out such that the reproduced image 60 may be constantly positioned in proximity to the hologram surface 51a of the holographic stereogram 51, and to generate a hologram image data D4, namely, an element hologram image data D5. Using the object light L2 undergone an image modulation by an element hologram image displayed on the transmission type liquid crystal display 29 based on the element hologram image data D5 subjected to the above-mentioned viewing point conversion processing and in combination with the reference light L3, the holographic stereogram producing device 10 exposes and records its holographic stereogram image on the hologram recording medium 4.

Figure 7B:
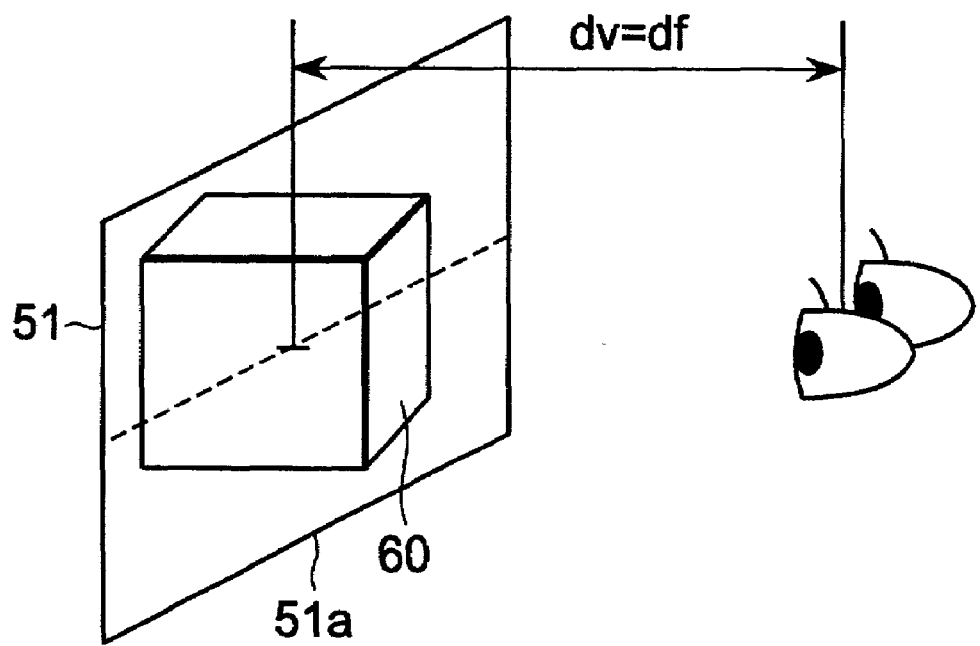

According to this viewing point conversion processing, in the holographic stereogram 51, as shown in FIG. 7B, its viewing point distance dv and the image shooting distance df of the parallax image data string D3 approximately coincide with each other, thereby enabling for the reproduced image 60 to be constantly positioned in the vicinity of the hologram surface 51a. Therefore, as shown in FIG. 7B, a clear and bright reproduced image 60 free from spatial distortion and blurring can be reproduced in the holographic stereogram 51 advantageously without requiring for the observer to view with his/her eyes in contact with the hologram surface 51a.

The principle of the viewing point conversion processing of the invention for reconstructing the element hologram image data D5 will be described with reference to FIGS. 8 and 9, in which the element hologram image data string D5 comprising element hologram images d2 (d21, - - - , d2n) of "n" pieces (sheets) is reconstructed from the parallax image data string D3 comprising element parallax images d1 (d11, - - - , d1m) of "m" pieces (sheets), which were captured by the re-centering method described above.

The holographic stereogram producing device 10, which is provided with the image processing computer 16 as described above, displays element hologram images d2 based on the hologram image data D4 processed with the viewing point conversion processing, that is, the element hologram image data D5, sequentially on the transmission type liquid crystal display 29 for exposure and recording on the hologram recording medium 4.

Figure 8:
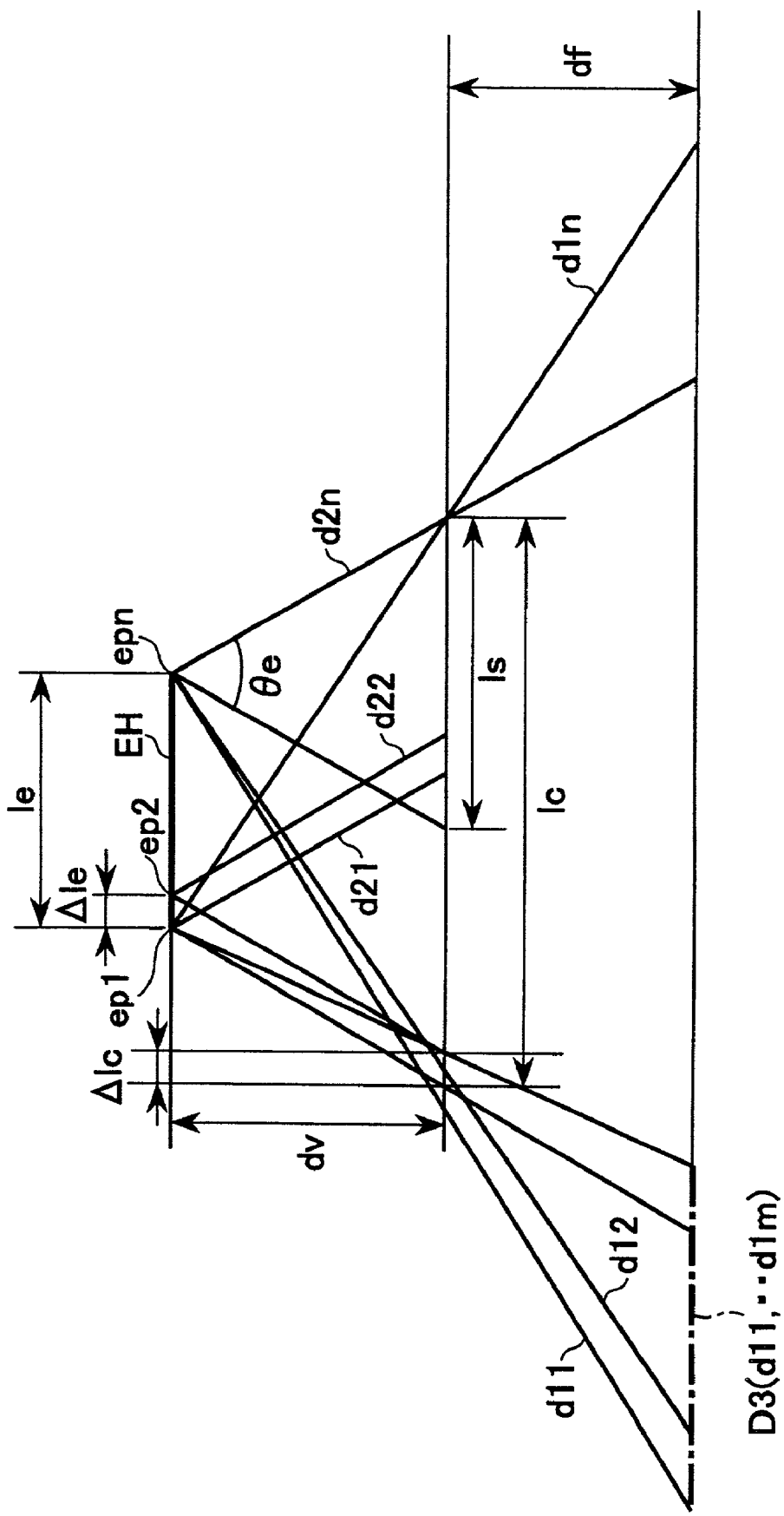
FIG. 8 is a diagram indicating more specifically the viewing point conversion processing by the image data processing unit, in which a positional relation between respective element holographic images and respective element parallax images is described.
Figure 9:
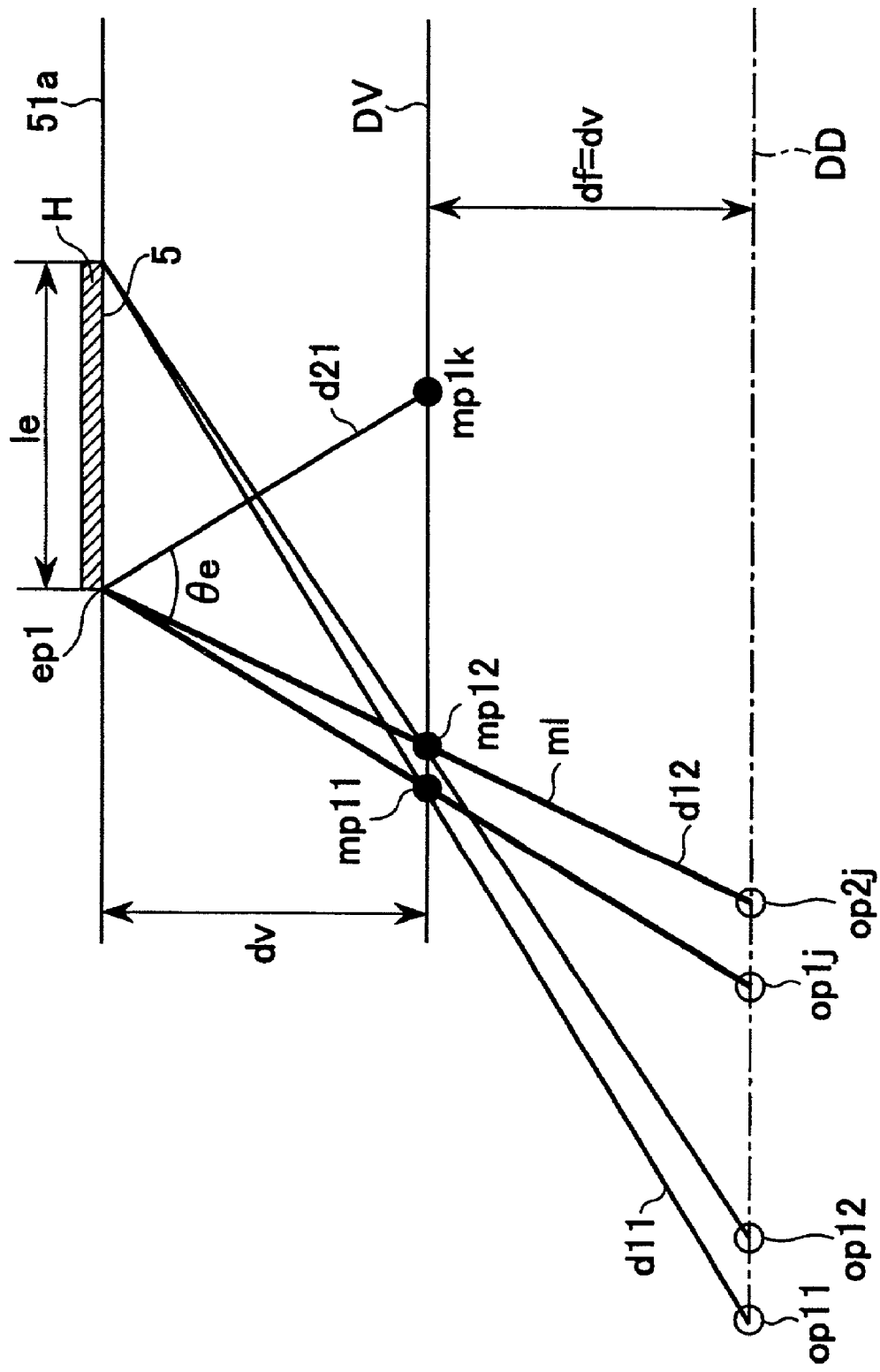
FIG. 9 is a diagram indicating the viewing point conversion processing by means of the image data processing unit more in detail, in which a state of a particular element holographic image taken from those in FIG. 8 and reconstructed is shown.

With reference to FIG. 8, suppose that an element hologram image EH is exposed and recorded at its respective exposure point ep (ep1, - - -, epn) on the hologram surface 51a of the holographic stereogram 51 which has a length "le" in the parallax direction, at this time a positional relationship between the element hologram image d2 of the element hologram image data D5 and the element parallax image d1 of the parallax image data string D3 is defined as shown in FIG. 8. By the way, in this drawing, the horizontal direction is defined as the parallax direction. At each exposure point ep, an element hologram image d2 is exposed and recorded from the viewing point dv at an exposure angle θe. To simplify the explanation, only three points ep1, ep2 and epn are shown among the exposure points ep1, - - -, epn. Needless to mention, the number of exposure points ep may vary depending on the lateral length le of the holographic stereogram 51 and a specified resolution of rendering in the holographic stereogram image, however, it is assumed, for example, that an equidistance pitch of 0.2 mm, and n=500.

A pitch Δle of each exposure point ep is equal to a pitch of the element hologram image d2, and has the following relationship (equation 1) relative to the lateral length le of the holographic stereogram 51.

$$le = n \times \Delta le \qquad (1)$$

Further, in the same drawing, "lc" denotes a shooting width of the parallax image data string D3 comprising the element parallax images dl of "m" pieces (sheets), "dv" denotes the viewing distance, and "df" denotes the image capture distance of the parallax image data string D3. By the way, the pitch Δle of each exposure point ep and the image capture width Δlc of the element parallax image d1 are not always equal, however, the parallax distance dv and the image shooting distance df are set equal to each other. At each exposure point ep on the holographic stereogram 51, each of the element hologram images d2 sequentially displayed on the transmission type liquid crystal display 29 is exposed for recording at an exposure angle of θe. Further, the element hologram image d2 is assumed to have an image size, in terms of resolution, of 640 pixels in the vertical direction and 480 pixels in the parallax direction.

Hence, the viewing point conversion processing is an image processing whereby the element parallax images d1 in the number of m sheets that constitute the parallax image data string D3 are interchanged to form the element hologram images d2 in the number of "n" sheets so as to reconstruct a new set of the element hologram image data D5. The viewing point conversion processing is executed by interchanging the element parallax images d1 by a minimum unit thereof, namely, by an element image in a strip-form with 640 pixels in the vertical direction and one pixel in the horizontal direction. By sampling this element image information from the element parallax images d1 in the number of "m" sheets, the element hologram image data D5 having an image size of 640 pixels in the vertical direction and 480 pixels in the horizontal (parallax) direction is reconstructed.

Further, with reference to FIG. 9, the viewing point conversion processing will be described more specifically. FIG. 9 shows a state of one element hologram image d21 selected from among those shown in FIG. 8, and how it is reconstructed. The element hologram image d21 is reconstructed through arithmetic operation to be executed for respective image information at respective sampling points mp11, mp12, - - -, mp1k on the viewing point distance dv whereby each of them is determined from which element parallax image d1 in the parallax image data string D3 to be mapped.

For this mapping, assume an imaginary line connecting between an exposure point ep1 and respective sampling points mp11, mp12, - - -, mp1k of the element hologram image d21, namely, a mapping line ml. A parallax image to be selected from among the parallax image data string D3 is determined to be that which has a closest viewing point to the point of an intersection between this mapping line ml and a plane DV on the viewing point distance dv, namely, respective sampling points mp11, mp12, - - -, mp1k. By the way, for simplification of explanation, it is shown in this drawing that all of the viewpoints of the parallax image data string D3 and all of the sampling points are shown to coincide with each other, however, needless to mention, they do not necessarily coincide with each other depending on conditions of setting of imaging (image capturing) parameters for the parallax image data string D3, and/or setting of parameters for the holographic stereogram 51 to be produced. Because the element hologram image d21 has the image size of 640 pixels in the vertical direction and 480 pixels in the horizontal direction as described above, the number of sampling in the parallax direction, namely, the number of pixels therein is "480", hence k=480.

As for the sampling point mp11, a parallax image having the closest viewing point thereto, namely, an element parallax image d11 having its viewpoint at mp11 is selected. Then, a piece of parallax information of 640 vertical pixels and one horizontal pixel existing at a cross point op1j on the surface of a screen DD at the image shooting distance df, at which the mapping line m11 interconnecting between the exposure point ep1 and the viewing point mp11 of that element parallax image d11, and extending toward a screen of the element parallax image d11, meets with the screen DD, is sampled and mapped to the sampling point mp11. Here, op denotes sampling points of the parallax image data string D3, and each parallax image has sampling points to the number of j. For example, the element parallax image d11 has sampling points at op11, op12, - - -, op1j. Because each element parallax image d1 is captured with an image size of 640 pixels in the vertical direction and 480 pixels in the horizontal direction, j=480.

In the viewing point conversion processing, by executing the image processing described above for the other sampling points mp12, - - -, mp1k, respectively, a new element hologram image d2 is reconstructed from the parallax image data string D3. Further, in the viewing point conversion processing, the similar image processing is repeated with respect to the other exposure points ep12, - - -, ep1j so as to reconstruct sequentially element hologram images d22, d23, - - -, d2n at respective exposure points ep. These element hologram image data D5 reconstructed as described above are displayed on the transmission type liquid crystal display 29 sequentially, and the object light L2 transmitted through this liquid crystal display 29 which interferes with the reference light L3 is exposed and recorded as the element hologram image in the strip-form sequentially on the hologram recording medium 4.

In the holographic stereogram 51 produced after executing this viewing point conversion processing, the viewing point shifts from the hologram surface 51a toward the observer by the viewing point distance dv, thereby enabling for the reproduced image 60 to be shifted toward the observer by the viewing point distance dv accordingly, and to be positioned constantly in the vicinity of the hologram surface 51a, as shown in FIG. 7B. Therefore, a high resolution reproduced image 60 free from the spatial distortion and blurring can be observed in the holographic stereogram 51 at the viewing distance dv.

By the way, in this viewing point conversion processing, if there exists no viewing point (capturing point) of the parallax image data string D3 on the mapping line ml interconnecting between the exposure point ep of the holographic stereogram image H and the sampling point mp for the element hologram image data D5, a parallax image the viewing point of which is closest to the sampling point mp of the element hologram image data D5 is selected from among the parallax image data string D3 present on the sampling plane DV, for its mapping processing is executed. The element hologram image data D5 in this case may have a discontinuity between respective pieces of parallax information as mapped at respective sampling points mp, thereby causing a phenomenon called jaggy.

To solve such problem, in the holographic stereogram producing device 10, an image capturing time spatial parameter TSP for use at the time of forming the parallax image data string D3 is set up so as to be able to fill in and obtain continuous parallax information between respective sampling points mp of the element hologram image data D5, and reconstruct a continuous element hologram image data D5 free from the jaggy phenomenon.

A method of setting up of the time spatial parameters will be described specifically by way of examples embodying the present invention.

Of the various time spatial parameters, those parameters to be defined and fixed by the optical system 15, as clearly known from FIG. 8, are the exposure angle θe, matching with the imaging angle of the second cylindrical lens 28, and the exposure pitch, namely, Δle which is the pitch of the element hologram image EH. Here, the display screen width ls of the transmission type liquid crystal display 29 is calculated by the following equation (2).

$$ls = 2dv \times \tan(\theta e/2) \quad (2)$$

By the way, as described above, dv is the viewing point distance from the hologram surface 51a and is equal to the image shooting (capturing) distance df of the parallax image data string D3. The sampling pitch Δls of the element hologram image d2 is calculated by the following equation (3):

$$\Delta ls = ls/(nx-1) \quad (3),$$

where nx is the number of pixels in the element hologram image d2 in the parallax direction (x-axis direction).

Here, if the sampling pitch Δls of the element hologram image d2 and the exposure pitch of the element hologram image EH, namely, Δle satisfy the condition of the following equation (4):

$$\Delta ls = w \times \Delta le \quad (4),$$

where w is a natural number, and if the imaging (shooting) pitch Δlc of the parallax image data string D3 holds a relation that $$\Delta lc = \Delta le \quad (5),$$

there is assumed to exist the viewing point of the parallax image data string D3 on every mapping line ml described above, thereby ensuring for the parallax information in the element hologram image data D5 reconstructed by the viewing point conversion processing to become continuous, thereby eliminating the jaggy phenomenon.

As an appropriate time spatial parameter suitable for use at image shooting of the parallax image data string D3 that can satisfy the above-mentioned conditions, the image shooting distance df (=viewing point dv) of the parallax image data string D3 the observation distance of which may be of any value if practically allowable is the only one parameter that has a relatively wide flexibility. Therefore, because it is advantageous to use the viewing point distance dv, this viewing point distance dv is calculated. An example of calculation of the time spatial parameter is described in the following.

For example, when producing a holographic stereogram 51 which has a horizontal width of 96.0 mm, a pitch of the element hologram image EH of 0.2 mm, and an imaging angle of 49.5°, it is specified such that le=96.0 mm, Δle=0.2 mm, θe=49.5°, respectively. In this instance, if n=3 in the above equation (4), Δls=0.6. Therefore, if it is set for the number of pixels in the element hologram image d2 in the parallax direction is set nx=480, a width ls of the display screen of the transmission type liquid crystal display 29 is calculated according to equation (3) to be that ls=287.4. The viewing point distance dv in this instance, namely, the image shooting distance df of the parallax image data string D3, is calculated by the above equation (2) to be that df=dv=311.71.

The holographic stereogram producing device 10 is supplied with the parallax image data string D3 obtained on the basis of the time spatial parameters set up as described above, and by executing the viewing point conversion processing to the parallax image data string D3 by means of the image data processing unit 11, reconstructs the element hologram image data D5 which is free from the jaggy. In the holographic stereogram producing device 10, the object light L2 is subjected to the image-modulation via the element hologram image EH which is based on this element hologram image data D5, and at the same time the holographic stereogram image H is exposed using this object light L2 and the reference image EH to be recorded on the hologram recording medium 4, and to produce the holographic stereogram 51. Therefore, this holographic stereogram 51 can replay a satisfactory quality of reproduced image 60 free from the spatial distortion, blurring and jaggy.

By the way, although the holographic stereogram 51 is corrected as to the viewing point positional information in the horizontal parallax direction by the viewing point conversion processing described above, as to the vertical direction, as-shot information at the time of capturing the parallax image data string D3 is maintained. In the holographic stereogram 51, when observed while moving the viewing point in the translation motion relative to the hologram surface 51a, in the same manner as in the case of shooting the consecutive images of the object P with the image shooting point of the camera moved in the translation motion, the reproduced image 60 of the object P is enabled to be reproduced in the vicinity of the hologram surface 51a in a satisfactory state free from the spatial distortion.

By the way, the viewing point conversion processing described above for reconstructing the element hologram image data D5 from the parallax image data string D3 is for reconstructing the new element hologram image data D5 by interchanging the element parallax images d1 in the parallax image data string D3, however, if the time spatial parameters are identical therebetween, even if it is a different parallax image data string of images having taken of a different object, the order (sequence) of its interchanging is identical therebetween. Therefore, if a data which records the sequence of interchanging of the element parallax images is prepared as a corresponding time spatial parameter having as an identical interchangeable condition that the image shooting distance df is equal to the viewing point distance dv which is one of the time spatial parameters of the parallax image data string D3 which is an object of the viewing point conversion processing, the holographic stereogram producing device 10 can proceeds with the viewing point conversion processing efficiently by referring to this time spatial parameter provided in advance.

Namely, in the holographic stereogram producing device 10, the viewing point conversion processing is executed by the above-mentioned method only for the initial element parallax image d1 of the parallax image data string D3 so as to be able to reconstruct the element hologram image data D5 and obtain a corresponding relation between the parallax information of the parallax image data string D3 and the parallax information of the element hologram image data D5. Then, this corresponding relation is stored as the time spatial parameter as described above in the storage server 3, and/or recorded in the recording medium MD. In the subsequent viewing point conversion processing, the holographic stereogram producing device 10 reads out a desirable time spatial parameter TSP from the storage server 3 and/or recording medium MD to execute the viewing point conversion processing on the basis thereof. Therefore, for this holographic stereogram producing device 10, because the desirable time spatial parameters TSP are automatically set up in the image capture device 1 and in the graphic image data generating computer 2, and are automatically supplied therefrom, it is not necessary to execute the viewing point conversion processing with repetition of the above-mentioned arithmetic operation and the like for every data of the parallax image data string D3, thereby enabling substantially to improve the speed of processing and minimize the processing time.

Now, as another example of processing in the image data processing unit 11 using the time spatial parameter TSP, there is a synthesizing processing, which will be described specifically in the following.

The holographic stereogram producing device 10 is also capable of performing a synthesizing processing using, for example, a so-called chromakey processing, a background differential processing or the like with respect to the parallax image data string D3 based on the captured image data D1 and/or computer graphics image data D2 by means of the image processing computer 16 in the image data processing unit 11.

At this instant, the holographic stereogram producing device 10 may select a plurality of different parallax image data strings D3 as an object of its synthesizing processing if the time spatial parameters thereof are identical or matching. If the element hologram image obtained on the basis of the element hologram image data D5 subjected to the synthesizing processing is exposed and recorded on the hologram recording medium 4, there can be produced a holographic stereogram in which a true image free from the distortion and blurring can be reproduced.

For example, if the captured image data D1 and/or the computer graphics image data D2 are motion images, and we assume that this motion image data is to be synthesized with some 2-dimensional images such as character information, graphic information and the like supplied as the another captured image data D1 and/or the another computer graphics image data D2 to the holographic stereogram producing device 10. The motion image data usually has timing information such as a rate and a reproducing period of time which differ depending on a difference in formats between NTSC (National Television System Committee) method, PAL (Phase Alternation by Line) method and the like. Therefore, in the case where the synthesizing processing directed to such motion image data is executed, setting of the parameters becomes easier if the timing parameter such as the image capture timing or the like is used in addition to the spatial parameter such as the image shooting distance and the like described above.

As a matter of course, the holographic stereogram-producing device 10 can perform the synthesizing processing, for example, to synthesize different 2-dimensional still image data as well. In this case, as the time spatial parameters requiring matching between the different parallax image data strings D3, the spatial parameter alone will suffice as described above. Further, the holographic stereogram-producing device 10 is also capable of executing the viewing point conversion processing described above concurrently with the synthesizing processing.

The holographic stereogram producing device 10, as supplied with plural different parallax image data strings D3 having the time spatial parameters which are identical therebetween, and upon processing these parallax image data strings D3 with the synthesizing processing by means of the image data processing unit 11, generates the synthesized element hologram image data D5 and produces the synthesized holographic stereogram 51. Thereby, the holographic stereogram 51 thus produced can replay a reproduced image having a satisfactory quality of display in which a plurality of different images are synthesized.

By way of example, this synthesizing processing may be executed also by the image capture device 1 and/or the graphic data generating computer 2. Namely, it may be arranged such that the image capture device 1 and the graphic data generating computer 2, under control of respective controllers which are not shown, treat a plurality of parallax image data strings having identical (matching) time spatial parameters corresponding therebetween as objects of synthesis, synthesize these parallax image data strings, then supply these synthesized image data as the captured image data D1 and the computer graphics image data D2 in association with these time spatial parameters to the image data processing unit 11. In this case, because this parallax image data string D3 was processed with the synthesizing processing, the image data processing unit 11 performs the viewing point conversion processing for this parallax image data string D3 when required so as to form the element hologram image data D5.

As described hereinabove, according to the holographic stereogram producing device 10 embodying the present invention, when producing the holographic stereogram on the basis of the parallax image string obtained by the image capture device 1 and/or the parallax image string generated by the graphic image data generating computer 2, the time spatial parameters which are required at the time of image shooting and/or at the time of generating the computer graphics data are controlled in a batch as stored in the storage server 3, and/or recorded in the recording medium MD so as to enable for this time spatial parameters under the batch control readily to be used at the time of forming the parallax image string. Therefore, it is enabled automatically to set up the time spatial parameters for the image capture device 1 and/or the graphics image data generating computer 2, thereby eliminating the time-consuming operation required for the holographic stereogram producing device 10 to repeat setting-up of the time spatial parameters for respective components separately. Therefore, advantageously according to the holographic stereogram producing device 10, the parallax image string can be formed easily and quickly, enabling to produce the holographic stereogram in which a satisfactory and correct reproduced image free from the distortion and blurring can be obtained.

Further, it should be noted that the present invention is not limited to the exemplary embodiments described above. For example, although the viewing point conversion processing has been described by way of example where the parallax image data string D3 was formed by the re-centering method, the parallax image data string D3 may be formed by any other image capturing (shooting) method as well. As a matter of course, in this case, setting of the time spatial parameters will be made also by a different method other than that described above.

Although the invention has been described in its preferred form with a certain degree of particularity, obviously many changes, variations and combinations are possible therein. It is therefore to be understood that any modifications will be practiced otherwise than as specifically described herein without departing from the scope of the present invention.

What is claimed is:

1. An image producing device for producing another parallax image string by executing a synthesizing process on a parallax image string including a plurality of image data each containing parallax information, comprising:
    a parameter interface for receiving a time spatial parameter indicative of one of time and spatial information for use in an image capturing and said forming of said other parallax image string; and
    a controller for enabling a plurality of different parallax image strings having an identical time spatial parameter indicating one of time and spatial information there between to be addressed as an object of synthetic operation, and outputting said another parallax image string produced by said synthesizing processing based on said time spatial parameter;
    wherein said time spatial parameter includes at least an image capture time.

2. A method of producing a second parallax image string by executing a synthesizing process on a first parallax image string including a plurality of image data each containing parallax information, comprising the steps of:
    receiving a time spatial parameter indicative of one of time and spatial information for use in an image capturing and said forming of said second parallax image string;
    processing a plurality of different parallax image strings having an identical time spatial parameter indicative of one of time and spatial information there between as an object of synthetic operation; and
    outputting said second parallax image string produced by said processing based on said time spatial parameter;
    wherein said time spatial parameter includes at least an image capture time.

* * * * *